(12) United States Patent
Fujioka

(10) Patent No.: US 9,341,334 B2
(45) Date of Patent: May 17, 2016

(54) OPTICAL FILM

(71) Applicant: NITTO DENKO CORPORATION, Ibaraki-shi, Osaka (JP)

(72) Inventor: Kazuya Fujioka, Osaka (JP)

(73) Assignee: NITTO DENKO CORPORATION, Osaka (JP)

( * ) Notice: Subject to any disclaimer, the term of this patent is extended or adjusted under 35 U.S.C. 154(b) by 0 days.

(21) Appl. No.: 14/662,341

(22) Filed: Mar. 19, 2015

(65) Prior Publication Data

US 2015/0276156 A1 Oct. 1, 2015

(30) Foreign Application Priority Data

Mar. 31, 2014 (JP) ................................. 2014-074265

(51) Int. Cl.
*F21S 11/00* (2006.01)
*G02B 19/00* (2006.01)
*B29D 11/00* (2006.01)
*E06B 9/24* (2006.01)

(52) U.S. Cl.
CPC .......... *F21S 11/007* (2013.01); *B29D 11/00663* (2013.01); *E06B 9/24* (2013.01); *F21S 11/00* (2013.01); *G02B 19/0028* (2013.01); *G02B 19/0042* (2013.01); *E06B 2009/2417* (2013.01); *Y02B 20/70* (2013.01)

(58) Field of Classification Search
CPC ........... E06B 9/24; F21S 11/00; G02B 5/045; G02B 19/0042; G02B 19/0019; G02B 19/0028
USPC .................................................. 359/592, 596
See application file for complete search history.

(56) References Cited

U.S. PATENT DOCUMENTS

| | | | | |
|---|---|---|---|---|
| 4,989,952 A | * | 2/1991 | Edmonds | 359/592 |
| 6,435,683 B1 | * | 8/2002 | Milner | 359/608 |
| 7,070,314 B2 | * | 7/2006 | Edmonds | 362/600 |
| 7,742,230 B2 | * | 6/2010 | Uchida et al. | 359/443 |
| 8,824,050 B2 | * | 9/2014 | Vasylyev | 359/595 |
| 2012/0033302 A1 | * | 2/2012 | Suzuki et al. | 359/597 |
| 2014/0055859 A1 | | 2/2014 | Vasylyev | |
| 2015/0072160 A1 | * | 3/2015 | Fujioka et al. | 428/461 |

FOREIGN PATENT DOCUMENTS

| | | |
|---|---|---|
| DE | 197 37 904 A1 | 3/1999 |
| JP | 2000-268610 A | 9/2000 |

OTHER PUBLICATIONS

European Search Report dated Sep. 9, 2015, issued in corresponding EP Application No. 15159596.4.

* cited by examiner

*Primary Examiner* — Christ Mahoney
(74) *Attorney, Agent, or Firm* — Sughrue Mion, PLLC

(57) ABSTRACT

An optical film includes a plurality of transparent layers configured to transmit light and a plurality of reflection layers configured to reflect light. The plurality of transparent layers are disposed at spaced intervals to each other in a first direction orthogonal to a thickness direction of the optical film; each of the plurality of reflection layers is interposed between the transparent layers that are next to each other of the plurality of transparent layers; and the plurality of transparent layers include a first transparent layer and a second transparent layer that has a smaller index of refraction than that of the first transparent layer.

6 Claims, 9 Drawing Sheets

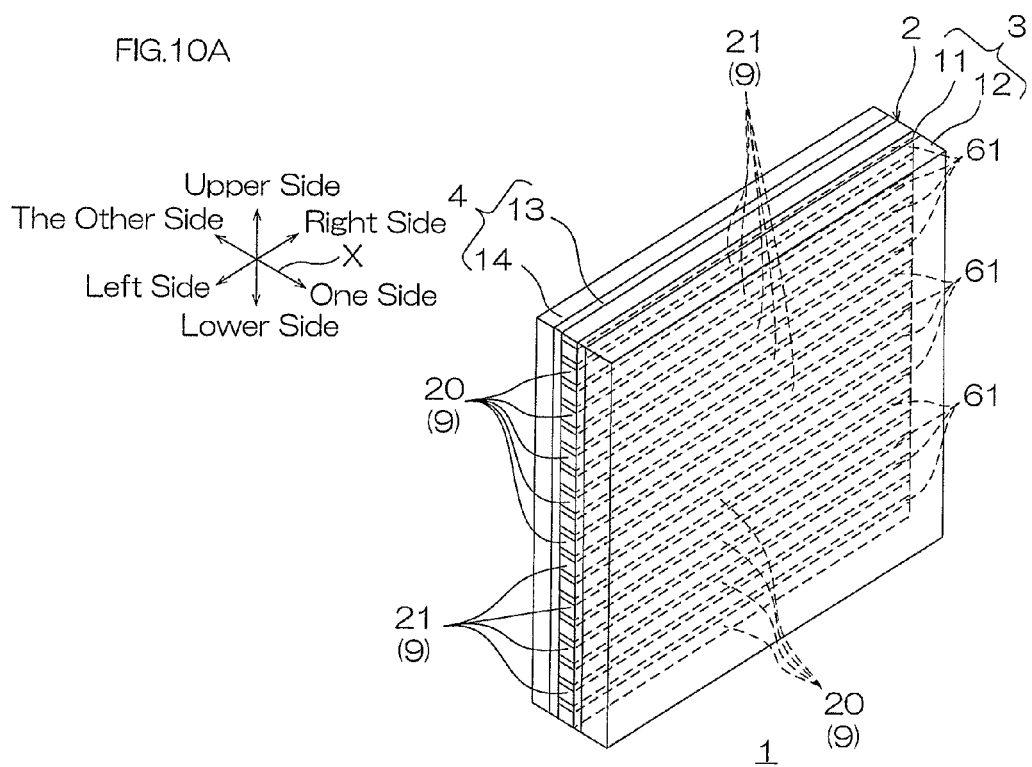
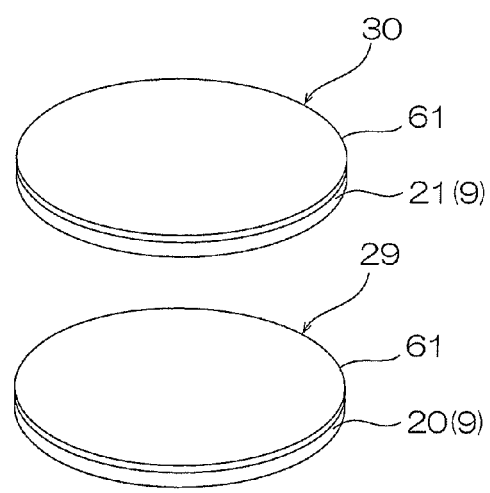

OPTICAL FILM

CROSS-REFERENCE TO RELATED APPLICATION

The present application claims priority from Japanese Patent Application No. 2014-074265 filed on Mar. 31, 2014, the contents of which are hereby incorporated by reference into this application.

BACKGROUND OF THE INVENTION

1. Field of the Invention

The present invention relates to an optical film, to be specific, to an optical film used for daylighting of a building such as a house.

2. Description of Related Art

Conventionally, it has been known to introduce sunlight into indoors to adjust environment, for example, brightness of indoors of a building, so-called daylighting (also called sunlight lighting and daylighting). However, recently, in view of reduction in environment burden, it is desired to introduce sunlight more efficiently into indoors to reduce use of artificial lighting during day.

Thus, various examinations are conducted to improve indoor brightness by introducing sunlight efficiently into indoors by attaching an optical member to, for example, a window: the optical member being capable of changing traveling direction of light based on optical behavior such as light refraction, diffraction, or reflection.

For such an optical member, for example, Japanese Unexamined Patent Publication No. 2000-268610 has proposed a transparent plastic plate in which a plurality of slits extending in horizontal directions are arranged at fixed intervals in vertical directions.

Such a plastic plate is placed, for example, at a window of a house and allows daylighting by reflecting and refracting sunlight entered from outdoors through the window.

SUMMARY OF THE INVENTION

However, the altitude of the sun changes with the lapse of time during day and, when the date (season) is different, differs even at the same time.

When the altitude of the sun is within a specific range, the plastic plate described in Japanese Unexamined Patent Publication No. 2000-268610 enables sunlight daylighting and improvement of indoor brightness. However, when the altitude of the sun is out of the specific range, there may be a case where efficient daylighting is not performed and sufficient indoor brightness is not ensured.

Thus, an object of the present invention is to provide an optical film that enables efficient and stable daylighting and improvement of the entire indoor brightness, even when the altitude of the sun changes.

An optical film of the present invention includes a plurality of transparent layers configured to transmit light and a plurality of reflection layers configured to reflect light, wherein the plurality of transparent layers are disposed at spaced intervals to each other in a first direction orthogonal to a thickness direction of the optical film; each of the plurality of reflection layers is interposed between the transparent layers that are next to each other of the plurality of transparent layers; and the plurality of transparent layers include a first transparent layer and a second transparent layer that has a smaller index of refraction than that of the first transparent layer.

With such a configuration, each of the plurality of reflection layers is interposed between the transparent layers that are next to each other of the plurality of transparent layers, so that the plurality of reflection layers are disposed at spaced intervals to each other (with the transparent layers therebetween) in the first direction and each of the transparent layers is sandwiched between the reflection layers that are next to each other of the plurality of reflection layers.

Thus, when the optical film is placed, for example, at a window of a house so that the first direction is along the vertical direction, sunlight from outdoors enters the transparent layer and then, is reflected at the reflection layer that is disposed below the transparent layer upwardly to be introduced into indoors from the transparent layer. Thereafter, the introduced sunlight is reflected at a ceiling or the like and illuminates the entire indoors. In this manner, improvement of brightness of the entire indoors can be achieved.

The light that enters the transparent layer (hereinafter, referred to as "incident light") enters the reflection layer at an incident angle corresponding to the altitude of the sun. When the incident angle of the incident light with respect to the reflection layer is within a specific range, the optical film can sufficiently improve indoor brightness. However, when the incident angle of the incident light with respect to the reflection layer is out of the specific range, the optical film cannot sufficiently improve indoor brightness.

When the incident angle of the incident light with respect to the reflection layer is out of the specific range, for example, the incident light is reflected at a lower-side reflection layer upwardly and thereafter, is again reflected at an upper-side reflection layer to then travel downwardly. When the downward light is introduced into indoors from the transparent layer, the light only illuminates the neighborhood of the window and brightness of another portion of indoors cannot be sufficiently ensured.

With the above-described configuration, however, the plurality of transparent layers include the first transparent layer having a relatively large index of refraction and the second transparent layer having a relatively small index of refraction, so that the sunlight is refracted relatively largely on entering the first transparent layer and it is refracted relatively small on entering the second transparent layer.

In this manner, the incident angle of the light entering the first transparent layer (hereinafter, referred to as "first incident light") with respect to the reflection layer can be different from that of the light entering the second transparent layer (hereinafter, referred to as "second incident light") with respect to the reflection layer.

Thus, a range of the incident angle of the incident light with respect to the reflection layer, corresponding to the altitude of the sun, can be expanded. As a result, even when the altitude of the sun changes, the optical film enables the incident light to travel upwardly toward, for example, a ceiling of a house. In this manner, even when the altitude of the sun changes, efficient and stable daylighting can be achieved and brightness of the entire indoors can be improved.

In the optical film of the present invention, it is preferable that a difference of index of refraction between the first transparent layer and the second transparent layer is 0.05 or more and 0.3 or less.

With such a configuration, a difference of index of refraction between the first transparent layer and the second transparent layer is 0.05 or more, so that the incident angle of the first incident light with respect to the reflection layer can be surely different from that of the second incident light with respect to the reflection layer. Thus, the range of the incident angle of the incident light with respect to the reflection layer, corresponding to the altitude of the sun, can be surely expanded. As a result, brightness of the entire indoors can be stably improved.

Also, a difference of index of refraction between the first transparent layer and the second transparent layer is 0.3 or less, so that material design of each of the first transparent layer and the second transparent layer can be easily achieved.

In the optical film of the present invention, it is preferable that in the plurality of transparent layers, the first transparent layer and the second transparent layer are alternately disposed in the first direction.

With such a configuration, the first transparent layer and the second transparent layer are alternately disposed in the first direction, so that the incident light can uniformly travel from the optical film upwardly in the entire first direction of the optical film. Thus, brightness of the entire indoors can be further more surely improved.

BRIEF DESCRIPTION OF THE DRAWINGS

FIG. 10A shows a perspective view of a daylighting film as a third embodiment of the present invention.

FIG. 10B shows a perspective view of a first unit film and a second unit film according to the daylighting film shown in FIG. 10A.

DETAILED DESCRIPTION OF THE INVENTION

1. Configuration of Daylighting Film

Figure 1:
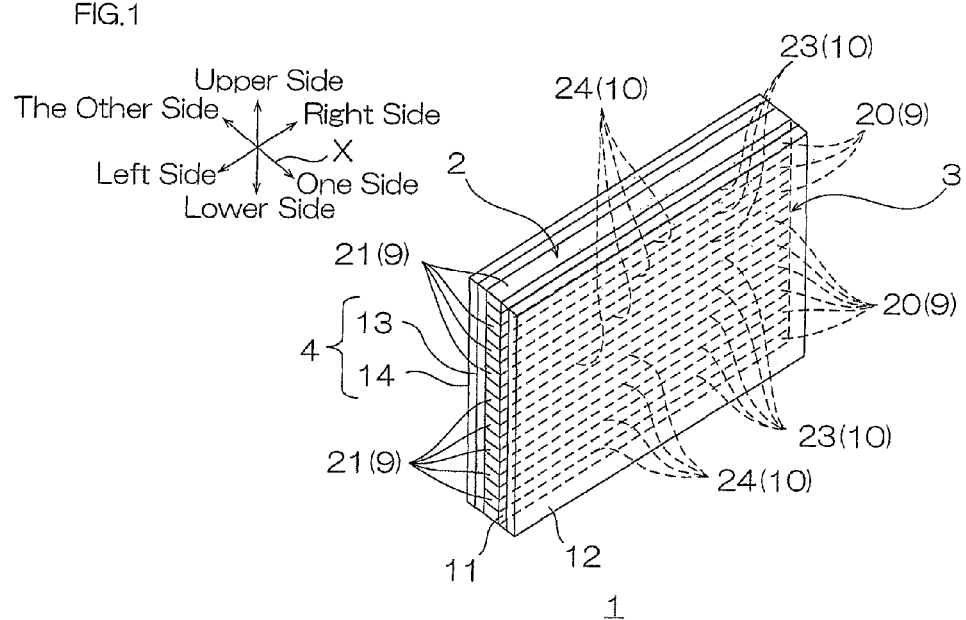
FIG. 1 shows a perspective view of a daylighting film as a first embodiment of an optical film of the present invention.

As shown in FIG. 1, a daylighting film 1, as one example of an optical film, is formed into a sheet shape (film shape) having flexibility and is formed into a rectangular shape when viewed in a thickness direction X of the daylighting film 1.

In the following description, when referring to directions, a case where the daylighting film 1 is viewed from one side in the thickness direction X is defined as the reference of right and left and a direction orthogonal to both directions of the thickness direction X and a right-left direction is defined as an up-down direction. To be specific, directions are in conformity with direction arrows shown in each view. The up-down direction is one example of a first direction.

The daylighting film 1 has a size in the thickness direction X of, for example, 30 μm or more, or preferably 50 μm or more, and, for example, 1500 μm or less, or preferably, in view of transparency, 500 μm or less.

The size of the daylighting film 1 is suitably changed in accordance with its purpose of use and the daylighting film 1 has a size in the right-left direction of, for example, 10 cm or more, or preferably 60 cm or more, and, for example, 200 cm or less, or preferably 100 cm or less. The daylighting film 1 has a size in the up-down direction of, for example, 5 cm or more, or preferably 10 cm or more, and, for example, 150 cm or less, or preferably 80 cm or less.

Figure 2:
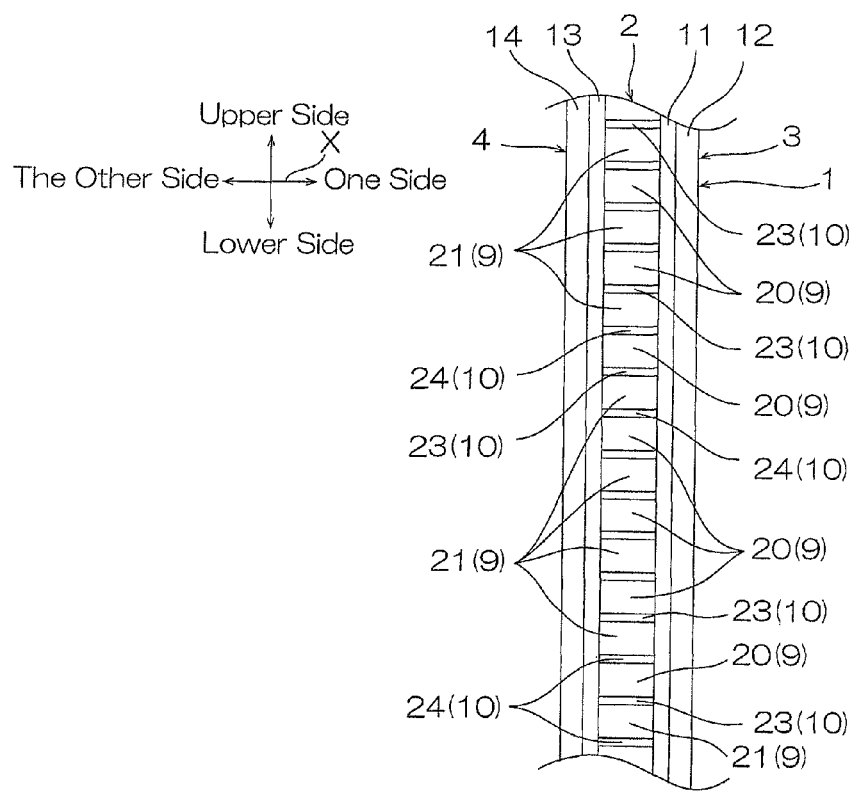
FIG. 2 shows a side view of the daylighting film shown in FIG. 1.

As shown in FIG. 2, the daylighting film 1 includes a daylighting layer 2, a support 3, and a peeling body 4.

The daylighting layer 2 is a generally central portion in the thickness direction X of the daylighting film 1 and includes a plurality of transparent layers 9 and a plurality of air layers 10 as one example of a reflection layer.

The plurality of transparent layers 9 are disposed in parallel at minute spaced intervals to each other (with the air layers 10 therebetween) in the up-down direction. As shown in FIGS. 1 and 2, each of the plurality of transparent layers 9 is configured to transmit light and is formed into a generally prism shape extending in the entire right-left direction of the daylighting layer 2. Each of both upper and lower surfaces of the transparent layer 9 is along the thickness direction X.

To be more specific, the plurality of transparent layers 9 include a plurality of first transparent layers 20 and a plurality of second transparent layers 21.

The first transparent layers 20 and the second transparent layers 21 are alternately and continuously disposed at minute spaced intervals to each other (with the air layers 10 therebetween) in the up-down direction.

The first transparent layer 20 is configured to have a larger index of refraction than that of the second transparent layer 21 and is preferably, in view of ease in processing, formed from a transparent first resin material.

Examples of the transparent first resin material include polyester (e.g., polyethylene terephthalate (PET)), polyolefin (e.g., polyethylene (PE), polypropylene (PP)), polycarbonate (PC), polyvinyl chloride (PVC), polystyrene (PS), epoxy resin, silicone resin, urethane resin, cellulose, polyvinylbutyral, ethylene vinyl acetate copolymers, and acrylic resin.

Of these first resin materials, preferably, a resin material having an index of refraction of 1.5 or more (e.g., polyethylene terephthalate, polyethylene, polycarbonate, polyvinyl chloride, polystyrene, epoxy resin, polyvinylbutyral, etc.) is used, or even more preferably, polycarbonate (index of refraction of 1.6) and polyvinyl chloride (index of refraction of 1.54) are used. These first resin materials can be used singly, or can be used in combination of two or more.

The first transparent layer 20 has an index of refraction (absolute refractive index) of, for example, 1.45 or more, or preferably 1.5 or more, and, for example, 1.8 or less, or preferably 1.65 or less. The index of refraction can be measured by a prism coupler.

When the index of refraction of the first transparent layer 20 is not less than the above-described lower limit value, a difference of index of refraction between the first transparent layer 20 and the second transparent layer 21 can be easily ensured. When the index of refraction of the first transparent layer 20 is not more than the above-described upper limit value, material design of the first resin material can be easily achieved.

The first transparent layer 20 has a light transmittance of, when the first transparent layer 20 has a thickness of 100 µm, for example, 80% or more, preferably 90% or more, or even more preferably 92% or more, and, for example, 98% or less with respect to light having a wavelength of 440 to 600 nm.

The first transparent layer 20 has a size in the up-down direction of, for example, 30 µm or more, or preferably 50 µm or more, and, for example, 500 µm or less, or preferably 300 µm or less.

The first transparent layer 20 has a size in the thickness direction X of, for example, 30 µm or more, or preferably 50 µm or more, and, for example, 1500 µm or less, or preferably 500 µm or less. The first transparent layer 20 has a size in the up-down direction of, for example, 20% or more, or preferably, in view of daylighting properties, 40% or more, and, for example, 1000% or less, or preferably, in view of daylighting properties, 500% or less with respect to 100% of size in the thickness direction X of the first transparent layer 20.

The second transparent layer 21 is configured to have a smaller index of refraction than that of the first transparent layer 20 and is formed from a transparent second resin material having a smaller index of refraction than that of the first resin material.

Examples of the second resin material include polyolefin (e.g., polyethylene (PE), polypropylene (PP)), silicone resin, urethane resin, cellulose, polyvinylbutyral, acrylic resin, and fluorine resin (e.g., tetrafluoroethylene•hexafluoride propylene copolymer (FEP), etc.).

The resin material illustrated as the second resin material is partially overlapped with the resin material illustrated as the first resin material. However, the second resin material is a resin material having a smaller index of refraction than that of the first resin material, and the same resin material as that of the first resin material is not selected. Meanwhile, as the second resin material, when the resin material has a smaller index of refraction than that of the resin material selected as the first resin material, the resin material illustrated as the first resin material can be also selected. When the first resin material is polycarbonate (index of refraction of 1.6), for example, a resin material having a smaller index of refraction than that of polycarbonate, such as polypropylene (index of refraction of 1.49), can be selected as the second resin material.

The index of refraction of each of the first resin material and the second resin material can be suitably adjusted by adding an additive or the like. Thus, when the index of refraction of the first resin material is different from that of the second resin material, even the resin materials having the same types of resin can be also selected.

Of these second resin materials, preferably, a resin material having an index of refraction of below 1.5 (e.g., polypropylene, silicone resin, urethane resin, cellulose, acrylic resin, fluorine resin, etc.) is used; even more preferably, fluorine resin and acrylic resin (index of refraction of 1.49) are used; or particularly preferably, tetrafluoroethylene•hexafluoride propylene copolymer (index of refraction of 1.34) is used. These second resin materials can be used singly, or can be used in combination of two or more.

The second transparent layer 21 has an index of refraction (absolute refractive index) of, for example, 1.2 or more, or preferably 1.3 or more, and, for example, 1.6 or less, preferably 1.55 or less, or particularly preferably below 1.5. The index of refraction can be measured by a prism coupler.

When the index of refraction of the second transparent layer 21 is not less than the above-described lower limit value, material design of the second resin material can be easily achieved. When the index of refraction of the second transparent layer 21 is not more than the above-described upper limit value, a difference of index of refraction between the first transparent layer 20 and the second transparent layer 21 can be easily ensured.

A difference of index of refraction between the first transparent layer 20 and the second transparent layer 21 is, for example, 0.04 or more, preferably 0.05 or more, even more preferably 0.1 or more, or particularly preferably 0.2 or more, and, for example, 0.4 or less, or preferably 0.3 or less.

When the difference of index of refraction between the first transparent layer 20 and the second transparent layer 21 is not less than the above-described lower limit value, even in the case where the altitude of the sun changes, stable daylighting properties can be sufficiently ensured. When the difference of index of refraction between the first transparent layer 20 and the second transparent layer 21 is not more than the above-described upper limit value, material design of each of the first resin material and the second resin material can be easily achieved.

The second transparent layer 21 has a light transmittance of, when the second transparent layer 21 has a thickness of 100 µm, for example, 80% or more, preferably 90% or more, or even more preferably 92% or more, and, for example, 98% or less with respect to light having a wavelength of 440 to 600 nm.

The second transparent layer 21 has a size in the up-down direction of, for example, 30 µm or more, or preferably 50 µm or more, and, for example, 500 µm or less, or preferably 300 µm or less. The size in the up-down direction of the second transparent layer 21 is, even more preferably, in view of productivity, the same as that in the up-down direction of the first transparent layer 20.

The second transparent layer 21 has a size in the thickness direction X of, for example, 30 µm or more, or preferably 50 µm or more, and, for example, 1500 µm or less, or preferably 500 µm or less. The size in the thickness direction X of the second transparent layer 21 is, even more preferably, in view of productivity, the same as that in the thickness direction X of the first transparent layer 20.

The second transparent layer 21 has a size in the up-down direction of, for example, 20% or more, or preferably, in view of daylighting properties, 40% or more, and, for example, 1000% or less, or preferably, in view of daylighting properties, 500% or less with respect to 100% of size in the thickness direction X of the second transparent layer 21.

The plurality of air layers 10 are interposed as a gap between the transparent layers 9 that are next to each other of the plurality of transparent layers 9. Thus, the plurality of air layers 10 are disposed in parallel at spaced intervals to each other (with the transparent layers 9 therebetween) in the up-down direction. The plurality of air layers 10 are, in the first embodiment, formed as a gap between the first transparent layers 20 and the second transparent layers 21 that are next to each other.

To be more specific, the plurality of air layers 10 include a plurality of first air layers 23 and a plurality of second air layers 24.

Each of the first air layers 23 is formed as a gap between the first transparent layer 20 and the second transparent layer 21 that is next at spaced interval thereto at the lower side thereof.

That is, the first air layer 23 is divided by the lower surface of the first transparent layer 20 and the upper surface of the second transparent layer 21.

Each of the second air layers 24 is formed as a gap between the second transparent layer 21 and the first transparent layer 20 that is next at spaced interval thereto at the lower side thereof. That is, the second air layer 24 is divided by the lower surface of the second transparent layer 21 and the upper surface of the first transparent layer 20.

Thus, each of the first air layer 23 and the second air layer 24 extends over the entire right-left direction of the daylighting layer 2. Borders (border 15, border 16, border, 17, and border 18 to be described later) between each of the first air layer 23 and the second air layer 24 and each of the first transparent layer 20 and the second transparent layer 21 are along the right-left direction and the thickness direction X.

The first air layer 23 has a size in the up-down direction of, for example, 0.1 μm or more, or preferably 1 μm or more, and, for example, 20 μm or less, or preferably 10 μm or less. The size in the up-down direction of the first air layer 23 with respect to that in the up-down direction of the first transparent layer 20 is, for example, 1/5000 or more, or preferably 1/300 or more, and, for example, 2/3 or less, or preferably 1/3 or less. The size in the up-down direction of the second air layer 24 is the same range as that in the up-down direction of the first air layer 23.

In the first embodiment, the second transparent layer 21 is disposed at the upper end portion of the daylighting layer 2 and the first transparent layer 20 is disposed at the lower end portion of the daylighting layer 2. However, each of both upper and lower end portions of the daylighting layer 2 may be any of the first transparent layer 20 and the second transparent layer 21, as long as it is the transparent layer 9, and can be changed suitably based on the shape and size of the daylighting film 1.

The support 3 is one side portion in the thickness direction X of the daylighting film 1 and is next to one side in the thickness direction X of the daylighting layer 2. The support 3 includes a carrier 12 and a pressure-sensitive adhesive layer 11.

The carrier 12 is one side portion in the thickness direction X of the support 3 and is configured to transmit light. Examples of the carrier 12 include a PET film carrier, a low adhesive carrier composed of fluorine polymer (e.g., polytetrafluoroethylene, polychlorotrifluoroethylene, polyvinyl fluoride, polyvinylidene fluoride, tetrafluoroethylene-hexafluoropropylene copolymer, chlorofluoroethylene-vinylidene fluoride copolymer, etc.), and a low adhesive carrier composed of nonpolar polymer (e.g., olefin resins such as polyethylene and polypropylene, etc.).

Of these examples of the carrier 12, preferably, a PET film and a low adhesive carrier composed of nonpolar polymer are used, or even more preferably, a polypropylene film is used.

The carrier 12 has a size in the thickness direction X of, for example, 10 μm or more, or preferably 30 μm or more, and, for example, 100 μm or less, or preferably 50 μm or less. The carrier 12 has a light transmittance of, when the carrier 12 has a size in the thickness direction X of 50 μm, for example, 85% or more, preferably 90% or more, or even more preferably 92% or more, and, for example, 98% or less with respect to light having a wavelength of 440 to 600 nm.

The pressure-sensitive adhesive layer 11 is the other side portion in the thickness direction X of the support 3 and is interposed between the carrier 12 and the daylighting layer 2. In this manner, the daylighting layer 2 adheres to the carrier 12.

Examples of a pressure-sensitive adhesive that forms the pressure-sensitive adhesive layer 11 include known pressure-sensitive adhesives such as epoxy pressure-sensitive adhesives, silicone pressure-sensitive adhesives, acrylic pressure-sensitive adhesives, and ultraviolet ray-curing pressure-sensitive adhesives. The pressure-sensitive adhesive preferably transmits light. The pressure-sensitive adhesive layer 11 can also be configured from a known double-sided adhesive tape.

Of these pressure-sensitive adhesives, preferably, acrylic pressure-sensitive adhesives are used. These pressure-sensitive adhesives can be used singly, or can be used in combination of two or more.

The pressure-sensitive adhesive layer 11 has a size in the thickness direction X of, for example, 1 μm or more, or preferably 5 μm or more, and, for example, 100 μm or less, or preferably 40 μm or less. When the carrier 12 itself has pressure-sensitive adhesiveness, the pressure-sensitive adhesive layer 11 is unnecessary in the support 3.

The peeling body 4 is the other side portion in the thickness direction X of the daylighting film 1 and is next to the other side in the thickness direction X of the daylighting layer 2. The peeling body 4 includes a peeling member 14 and a pressure-sensitive adhesive layer 13.

The peeling member 14 is the other side portion in the thickness direction X of the peeling body 4. An example of the peeling member 14 includes the same carrier as that of the carrier 12. Preferably, a PET film and a low adhesive carrier composed of nonpolar polymer are used, or even more preferably, a PET film is used.

The peeling member 14 has a size in the thickness direction X of, for example, 10 μm or more, or preferably 40 μm or more, and, for example, 100 μm or less, or preferably 60 μm or less.

Although not shown, a release-treatment layer (not shown) is provided on one side surface in the thickness direction X of the peeling member 14.

The pressure-sensitive adhesive layer 13 is one side portion in the thickness direction X of the peeling body 4 and is interposed between the release-treatment layer (not shown) of the peeling member 14 and the daylighting layer 2. In this manner, the daylighting layer 2 adheres to the peeling member 14.

An example of the pressure-sensitive adhesive that forms the pressure-sensitive adhesive layer 13 includes the same pressure-sensitive adhesive as that forms the pressure-sensitive adhesive layer 11. Of these pressure-sensitive adhesives, preferably, acrylic pressure-sensitive adhesives are used. These pressure-sensitive adhesives can be used singly, or can be used in combination of two or more. The pressure-sensitive adhesive layer 13 can also be configured from a known double-sided adhesive tape.

The pressure-sensitive adhesive layer 13 has a size in the thickness direction X of, for example, 5 μm or more, or preferably 20 μm or more, and, for example, 100 μm or less, or preferably 60 μm or less.

2. Production Method of Daylighting Film

Next, a method for producing the daylighting film 1 is described.

Figure 3:
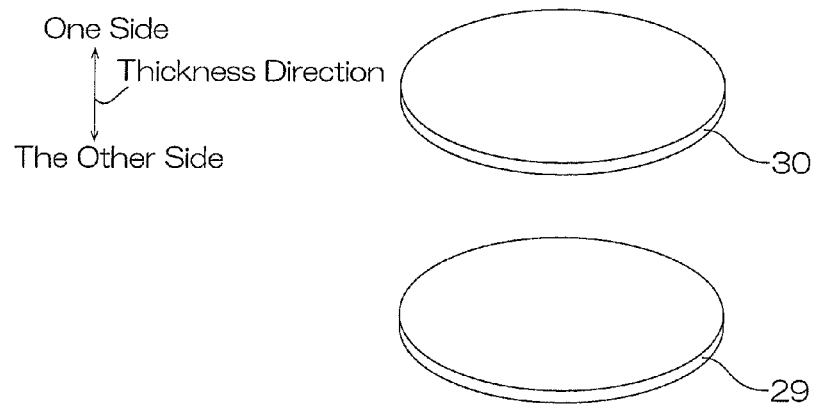
FIG. 3 shows a perspective view of a first unit film and a second unit film according to the daylighting film shown in FIG. 2.

To produce the daylighting film 1, as shown in FIG. 3, first, each of a first unit film 29 corresponding to the first transparent layer 20 and a second unit film 30 corresponding to the second transparent layer 21 is prepared in a plural number.

To prepare the first unit film 29, for example, a first processing sheet composed of the first transparent layer 20 is prepared and then, the first unit films 29 having a predetermined shape are cut out from the first processing sheet. The first unit film 29 can be cut out from the first processing sheet by a known processing method, for example, by cutting and punching.

To prepare the second unit film 30, for example, a second processing sheet composed of the second transparent layer 21 is prepared and then, the second unit films 30 having a predetermined shape are cut out from the second processing sheet. An example of a method for cutting out the second unit film 30 from the second processing sheet includes the above-described processing method.

The shape of each of the first unit film 29 and the second unit film 30 is not particularly limited, and the first unit film 29 and the second unit film 30 are formed, for example, into a polygonal shape or circular shape, preferably into a rectangular or circular shape, or particularly preferably into a circular shape when viewed in the thickness direction thereof by the above-described cutting method.

The size of the first unit film 29 and the second unit film 30 is suitably changed in accordance with its purpose of use. To be specific, when the first unit film 29 and the second unit film 30 are circular when viewed in the thickness direction, the diameter is, for example, 10 cm to 1 m (100 cm), or preferably, in view of processability, 10 cm to 50 cm.

Each of the first unit film 29 and the second unit film 30 is prepared in a plural number, for example, 100 or more, or preferably 5000 or more, and, for example, 30000 or less, preferably 15000 or less, or even more preferably 10000 or less.

To prepare the first unit film 29 in a plural number, for example, the first processing sheet is formed to be large so that a plurality of first unit films 29 can be cut out, and the first unit film 29 can be cut out in a plural number from the first processing sheet, or the first processing sheet can be prepared in a plural number and one first unit film 29 can be cut out from each of the first processing sheets.

To prepare the second unit film 30 in a plural number, the second unit film 30 can be cut out in a plural number from the second processing sheet that is formed to be large, or one second unit film 30 can be cut out from each of the plurality of second processing sheets in the same manner as a case where the first unit film 29 is prepared in a plural number. The plurality of first unit films 29 and the plurality of second unit films 30 preferably have the same shape and size.

Figure 4:
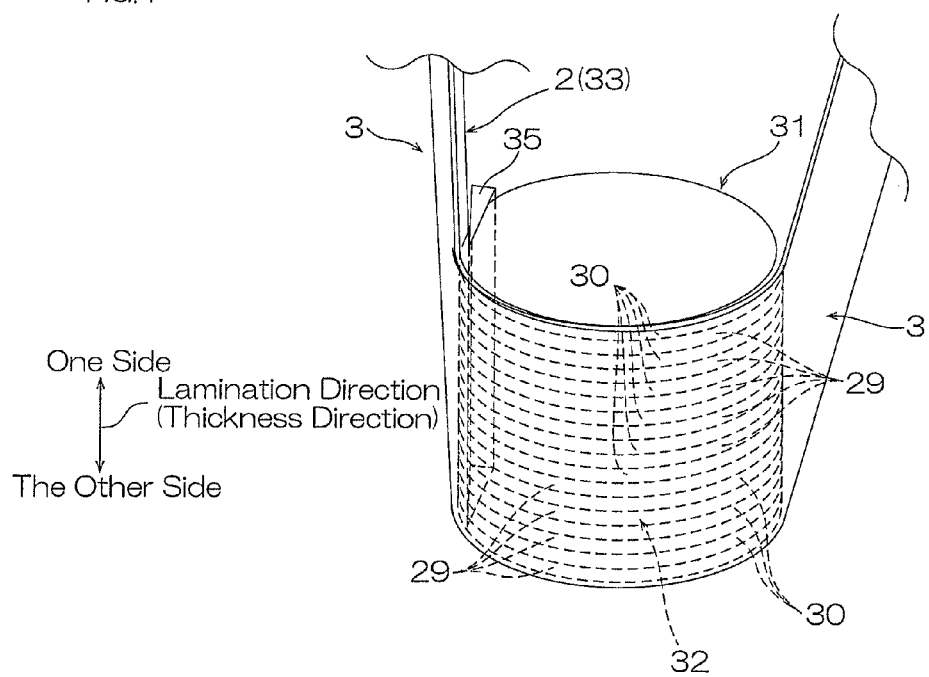
FIG. 4 shows an explanatory view for illustrating a step in which a support is bonded to a lateral face of a laminate formed by laminating the first unit films and the second unit films shown in FIG. 3 and then, a lateral face layer of the laminate is cut.

Then, as shown in FIG. 4, the plurality of first unit films 29 and the plurality of second unit films 30 are laminated in the thickness direction without sandwiching a pressure-sensitive adhesive layer therebetween, thereby preparing a laminate 31.

To be more specific, the first unit films 29 and the second unit films 30 are laminated in the thickness direction thereof so that they are alternately overlapped with each other. That is, the thickness direction of the first unit film 29, the thickness direction of the second unit film 30, and the lamination direction of the laminate 31 are the same direction.

In the laminate 31, the air is slightly interposed between the first unit film 29 and the second unit film 30 that are next to each other in the lamination direction and the air serves as the air layer 10, which divides the first unit film 29 and the second unit film 30 that are next to each other.

In FIG. 4, for simplicity, the number of the plurality of first unit films 29 and the plurality of second unit films 30 is simplified, and the laminate 31 is composed of nine first unit films 29 and nine second unit films 30, but actually, the laminate 31 is formed by laminating, for example, 100 to 30000, preferably 5000 to 15000, or even more preferably 5000 to 10000 first unit films 29 and, for example, 100 to 30000, preferably 5000 to 15000, or even more preferably 5000 to 10000 second unit films 30.

When each of the first unit films 29 and each of the second unit films 30 are formed into the same shape and size, the plurality of first unit films 29 and the plurality of second unit films 30 are laminated so that their outer peripheral end edges coincide with each other when projected in the lamination direction.

In the above manner, a columnar (block) laminate 31 extending in the lamination direction is formed. For example, when the first unit film 29 and the second unit film 30 are rectangular when viewed in the thickness direction, a prism laminate 31 is formed and when the first unit film 29 and the second unit film 30 are circular when viewed in the thickness direction, a cylindrical laminate 31 is formed.

The laminate 31 has a height (lamination direction length) of, for example, 1 cm or more, preferably 5 cm or more, or even more preferably 10 cm or more, and, for example, 200 cm or less, preferably 100 cm or less, or even more preferably 50 cm or less.

Then, after the support 3 is bonded to a lateral face 32 (surface extending along the lamination direction) of the laminate 31 along the lamination direction, a lateral face layer 33 of the laminate 31 to which the support 3 is bonded is cut so that the first unit films 29 and the second unit films 30 are disposed in parallel to the lamination direction of the laminate 31.

The lateral face layer 33 of the laminate 31 can be cut by any method without limitation as long as the lateral face layer 33 supported by the support 3 can be cut out from the laminate 31.

Figure 5:
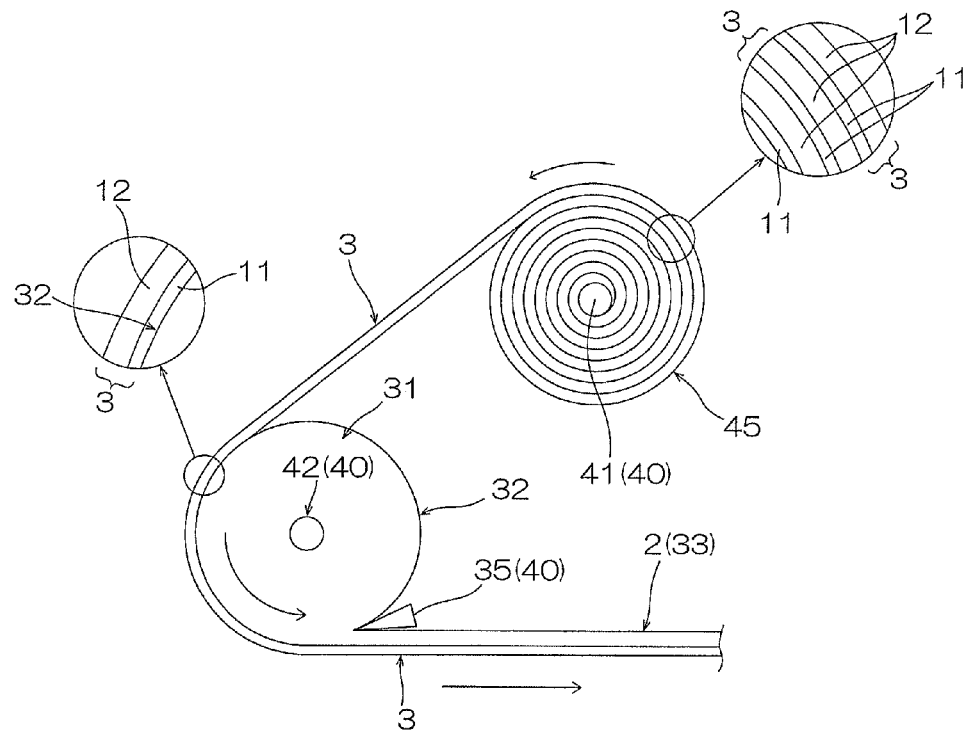
FIG. 5 shows an explanatory view for illustrating a step in which a support drawn out from a support roll is bonded to the lateral face of the laminate shown in FIG. 4 and then, a lateral face layer of the laminate is continuously cut.
Figure 6:
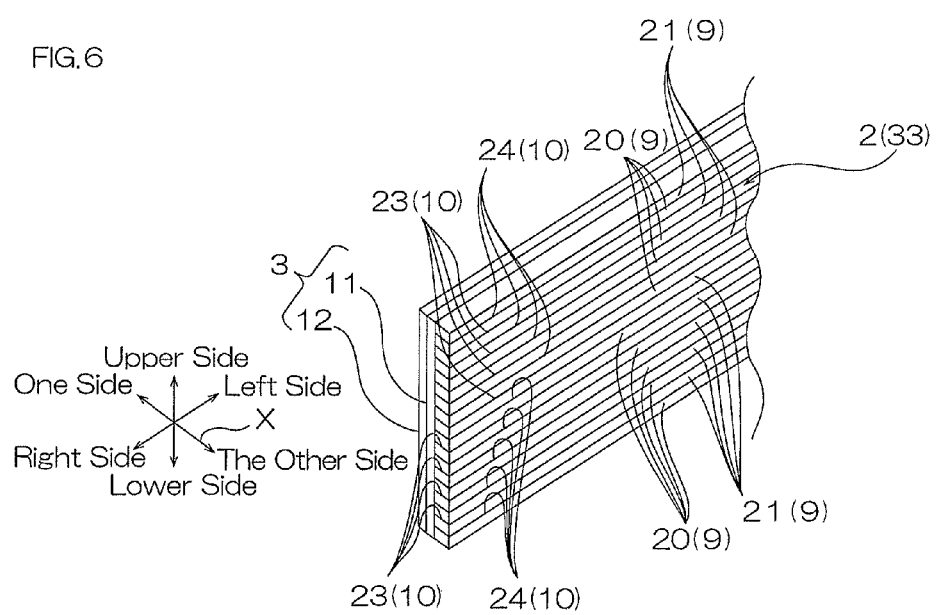
FIG. 6 shows a perspective view of the daylighting layer and the support shown in FIG. 5.

Of these cutting methods, in view of productivity, preferably, the laminate 31 is formed into a cylindrical shape and, as shown in FIG. 5, the lateral face layer 33 of the laminate 31 is continuously cut out from the laminate 31 with a cutting device 40.

The cutting device 40 includes a rotational shaft 41, a pair of holding members 42, and a cutting blade 35.

The rotational shaft 41 is generally cylindrical and is configured to be rotatable with its axis as the center. The elongated flat belt support 3 is wound around the rotational shaft 41. To be specific, the elongated flat belt support 3 is wound like a swirl around the rotational shaft 41 so that the pressure-sensitive adhesive layer 11 is positioned inside with respect to the carrier 12 in the radial direction of the rotational shaft 41. In this manner, the support 3 is configured as a support roll 45 with the rotational shaft 41 as the center. The release-treatment layer (not shown) is provided on the surface of the carrier 12 opposite to the side where the pressure-sensitive adhesive layer 11 is provided. The peeling force of the carrier 12 is suitably adjusted by the release-treatment layer.

In the support roll 45, the support 3 is disposed so as to be next to each other in the radial direction of the rotational shaft 41, and the pressure-sensitive adhesive layer 11 and the carrier 12 are disposed one by one repeatedly. As described above, the release-treatment layer is provided on the surface of the carrier 12 opposite to the side where the pressure-sensitive adhesive layer 11 is provided and therefore, in the radial direction of the rotational shaft 41, between the supports 3 that are next to each other, to be specific, between the pressure-sensitive adhesive layer 11 of the support 3 disposed outside in the radial direction and the carrier 12 of the support 3 disposed inside in the radial direction, the release-treatment layer is interposed.

The pair of holding members 42 is disposed in spaced apart relation in the radial direction of the support roll 45 with respect to the support roll 45. Each of the pair of holding members 42 is a generally circular shape and is configured to be rotatable with its axis as the center.

The pair of holding members 42 is disposed in spaced apart relation from each other in the axial direction of the holding members 42. The pair of holding members 42 holds the laminate 31 by pressing the generally cylindrical laminate 31 from both sides in the lamination direction.

The conditions for pressing include, for example, a pressure from one side (the other side) of the lamination direction of the laminate 31 of, for example, 0.01 MPa or more, or preferably 0.1 MPa or more, and for example, 10 MPa or less, or preferably 5 MPa or less.

Each of the holding members 42 is disposed so that the laminate 31 and the axis coincide with each other when the laminate 31 is held.

The cutting blade 35 is disposed along the lamination direction with respect to the lateral face 32 of the laminate 31 held by the pair of holding members 42 and the distal end of the cutting blade 35 is in contact with the lateral face 32 of the laminate 31 from a generally tangential line direction.

The cutting blade 35 is configured so that the cutting blade 35 is brought closer to the axis of the laminate 31 as the diameter of the laminate 31 decreases along the advancement of the cutting step while the distal end of the cutting blade 35 is making contact with the lateral face 32 of the laminate 31.

To continuously cut out the lateral face layer 33 of the laminate 31 with the cutting device 40, first, the support 3 drawn out from the support roll 45 is bonded to the lateral face 32 of the laminate 31 held by the pair of holding members 42.

To be more specific, the support 3 that is drawn is pulled around toward the tangential line direction of the laminate 31 so that the drawn pressure-sensitive adhesive layer 11 of the support 3 adheres to the lateral face 32 of the laminate 31 and is bonded to the lateral face 32 of the laminate 31 where the central angle of the laminate 31 is in the range of, for example, 90° to 270°, or preferably 120° to 240°.

Then, the pair of holding members 42 is driven and rotated counterclockwise when viewed from one side in the axial direction of the holding member 42 (frontward relative to the paper plane in FIG. 5) by the driving force from a driving source such as a motor included in the cutting device 40.

This causes the laminate 31 held by the pair of holding members 42 to rotate with its axis as the center and the support roll 45 is driven with the axis of the rotational shaft 41 as the center.

In this manner, the lateral face layer 33 of the laminate 31 to which the support 3 is bonded is cut out continuously with the cutting blade 35 like Katsura-muki. The thickness of the lateral face layer 33 that is cut out can be adjusted suitably by the position and angle of the cutting blade 35 with respect to the laminate 31 at the time of cutting the laminate 31.

In the above manner, as shown in FIB. 6, the lateral face layer 33 having one side surface to which the support 3 is bonded, that is, the daylighting layer 2 having one side surface to which the support 3 is bonded is continuously cut out from the laminate 31 in an elongated flat belt shape.

Next, the peeling body 4 is bonded to the other side surface of the daylighting layer 2. To be more specific, the pressure-sensitive adhesive layer 13 of the peeling body 4 adheres to the other side surface of the daylighting layer 2.

In this manner, as shown in FIG. 2, the support 3 and the peeling body 4 are bonded to the daylighting layer 2 so as to sandwich the daylighting layer 2 therebetween, thereby preparing the daylighting film 1.

Thereafter, the daylighting film 1 is cut into a predetermined shape and size. The daylighting film 1 can be cut by a known processing method such as cutting and punching.

3. Usage Pattern of Daylighting Film

Next, a usage pattern of the daylighting film 1 is described.

Figure 7:
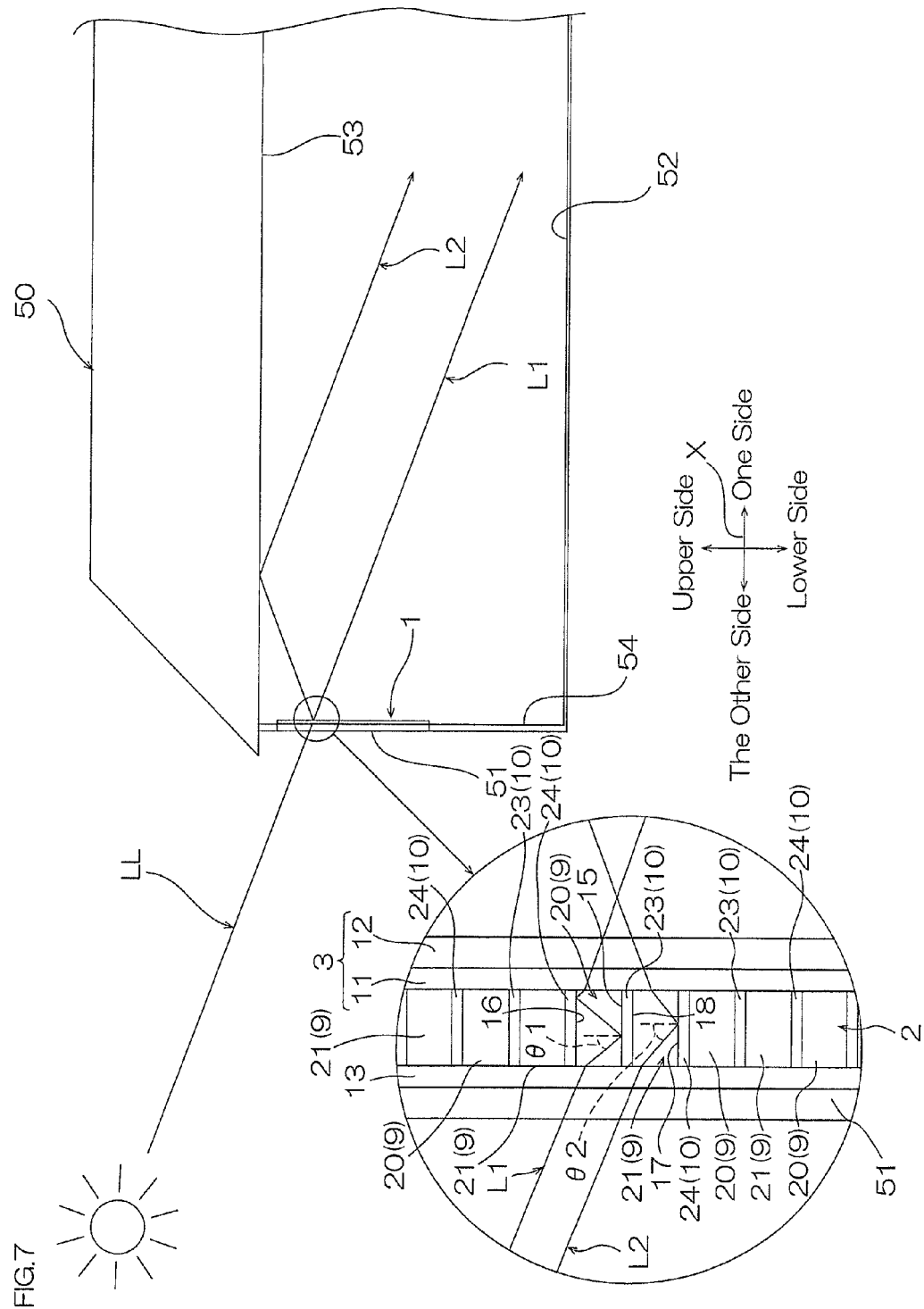
FIG. 7 shows a schematic diagram for illustrating the daylighting film shown in FIG. 1 attached to a glass window and showing a case where the altitude of the sun is relatively low.

The daylighting film 1 is attached, as shown in FIG. 7, for example, to an inner side surface of a glass window 51 of a building such as a house 50.

To attach the daylighting film 1 to the inner side surface of the glass window 51, first, the peeling member 14 is peeled. Then, the exposed pressure-sensitive adhesive layer 13 adheres to the inner side surface of the glass window 51. In this manner, the daylighting film 1 is attached to the inner side surface of the glass window 51.

In a state where the daylighting film 1 is attached to the glass window 51, when the altitude of the sun is relatively low, sunlight LL having a relatively small incident angle with respect to the glass window 51 is incident from the outside of the house 50 (outdoors) through the glass window 51. Then, a part of light of the sunlight LL enters the first transparent layer 20. Of the sunlight LL, the sunlight that enters the first transparent layer 20 is defined as a first incident light L1.

The first incident light L1 is, on the interface of the first transparent layer 20, refracted so that the inclination thereof downwardly is increased. Thereafter, the first incident light L1 reaches the border 15 between the first transparent layer 20 and the first air layer 23. Then, the first incident light L1 is reflected on the border 15 (first air layer 23) and travels upwardly in the first transparent layer 20 to then reach the border 16 between the second transparent layer 21 and the second air layer 24.

Then, the first incident light L1 is reflected on the border 16 (second air layer 24) and travels downwardly to be then emitted from the first transparent layer 20 toward the inside of the house 50. At this time, the first incident light L1 is, on the interface of the first transparent layer 20, refracted so that the inclination thereof downwardly is reduced. Thereafter, the first incident light L1 travels toward a floor 52 of the house 50.

Another portion of light of the sunlight LL enters the second transparent layer 21. Of the sunlight LL, the sunlight that enters the second transparent layer 21 is defined as a second incident light L2. The sunlight is parallel light, so that the incident angle of the second incident light L2 with respect to the second transparent layer 21 is generally the same as that of the first incident light L1 with respect to the first transparent layer 20.

The second incident light L2 is, on the interface of the second transparent layer 21, refracted so that the inclination thereof downwardly is increased and reaches the border 17 between the second transparent layer 21 and the second air layer 24.

The second incident light L2 is, when entering the second transparent layer 21, refracted small, compared to the first incident light L1 that enters the first transparent layer 20. Thus, an incident angle θ2 of the second incident light L2 with respect to the border 17 is larger than an incident angle θ1 of the first incident light L1 with respect to the border 15.

Thereafter, the second incident light L2 is reflected on the border 17 (second air layer 24) and travels upwardly in the first transparent layer 20 to be then emitted from the second transparent layer 21 toward the inside of the house 50. At this time, the second incident light L2 is, on the interface of the second transparent layer 21, refracted so that the inclination thereof upwardly is reduced. Thereafter, the second incident light L2 travels toward a ceiling 53 of the house 50; then, for example, is reflected on the ceiling 53; and reaches farther from the glass window 51 than the first incident light L1 in the house 50. In this manner, brightness of the inside of the house 50 is improved.

Figure 8:
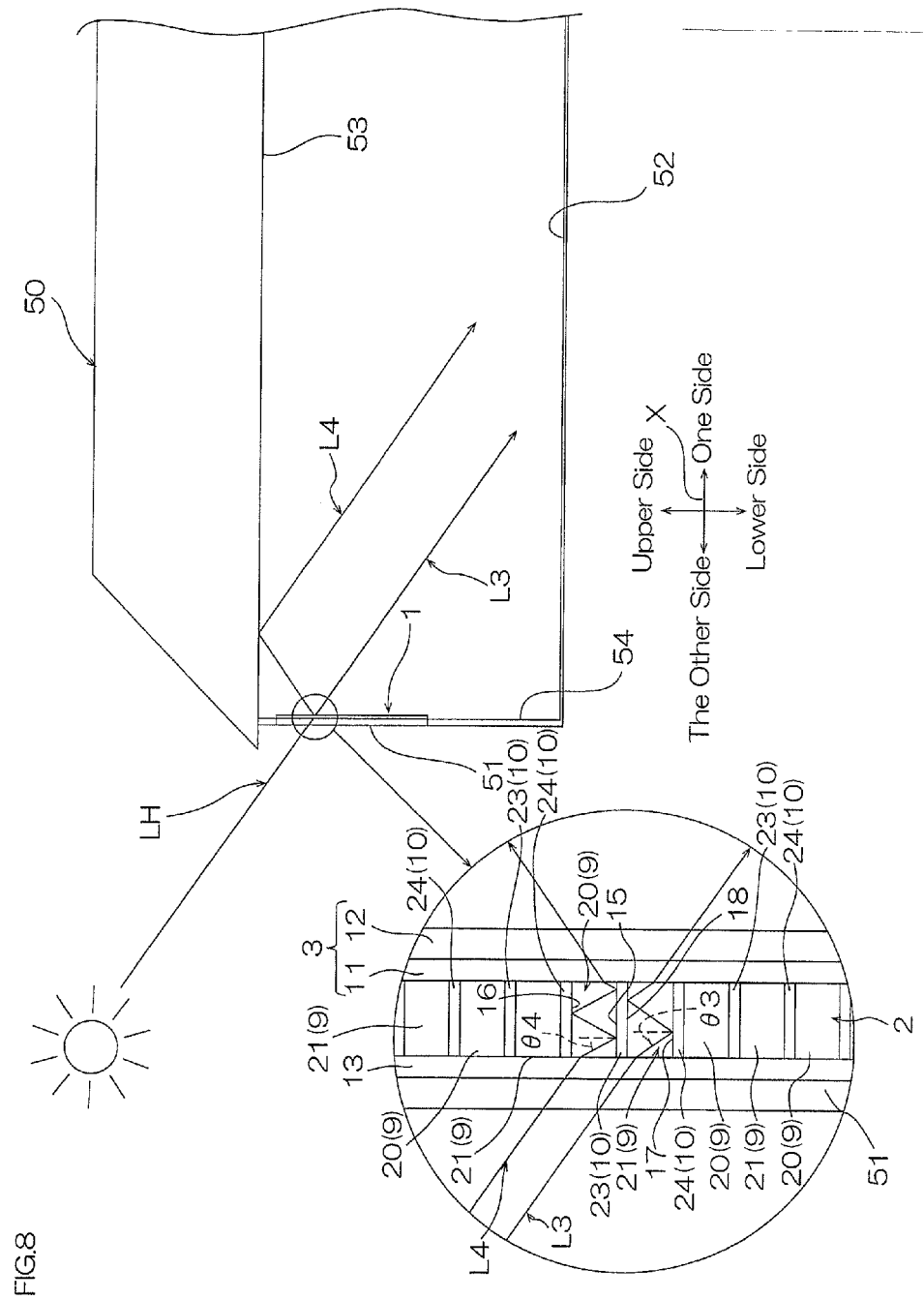
FIG. 8 shows a schematic diagram for illustrating the daylighting film shown in FIG. 1 attached to a glass window and showing a case where the altitude of the sun is relatively high.

Meanwhile, when the altitude of the sun increases and becomes relatively high, as shown in FIG. 8, sunlight LH having a relatively large incident angle with respect to the glass window 51 is incident from the outside of the house 50 (outdoors) through the glass window 51.

Then, another portion of light of the sunlight LH enters the second transparent layer 21. Of the sunlight LH, the sunlight that enters the second transparent layer 21 is defined as a second incident light L3.

The second incident light L3 is, on the interface of the second transparent layer 21, refracted so that the inclination thereof downwardly is increased and reaches the border 17 between the second transparent layer 21 and the second air layer 24.

Then, the second incident light L3 is reflected on the border 17 (second air layer 24) and travels upwardly in the first transparent layer 20 to then reach the border 18 between the second transparent layer 21 and the first air layer 23.

Thereafter, the second incident light L3 is reflected on the border 18 (first air layer 23) and travels downwardly to be then emitted from the second transparent layer 21 toward the inside of the house 50. At this time, the second incident light L3 is, on the interface of the second transparent layer 21, refracted so that the inclination thereof downwardly is reduced. Thereafter, the second incident light L3 travels toward the floor 52 of the house 50.

Another portion of light of the sunlight LH enters the first transparent layer 20. Of the sunlight LH, the sunlight that enters the first transparent layer 20 is defined as a first incident light L4. The sunlight is parallel light, so that the incident angle of the first incident light L4 with respect to the first transparent layer 20 is generally the same as that of the second incident light L3 with respect to the second transparent layer 21.

The first incident light L4 is, on the interface of the first transparent layer 20, refracted so that the inclination thereof downwardly is increased and reaches the border 15 (first air layer 23) between the first transparent layer 20 and the first air layer 23.

The first incident light L4 is, when entering the first transparent layer 20, refracted largely, compared to the second incident light L3 that enters the second transparent layer 21. Thus, an incident angle $\theta 4$ of the first incident light L4 with respect to the border 15 is smaller than an incident angle $\theta 3$ of the second incident light L3 with respect to the border 17.

Thereafter, the first incident light L4 is reflected on the border 15 (first air layer 23); travels upwardly in the first transparent layer 20; and then, reaches the border 16 (second air layer 24) to be reflected. Then, the first incident light L4 travels downwardly in the first transparent layer 20 and again reaches the border 15 (first air layer 23) to be reflected.

In this manner, the first incident light L4 travels upwardly and is emitted from the first transparent layer 20 toward the inside of the house 50. At this time, the first incident light L4 is, on the interface of the first transparent layer 20, refracted so that the inclination thereof upwardly is reduced. Thereafter, the first incident light L4 travels toward the ceiling 53 of the house 50; then, for example, is reflected on the ceiling 53; and reaches farther from the glass window 51 than the second incident light L3 in the house 50. In this manner, brightness of the inside of the house 50 is improved.

In the daylighting film 1, as shown in FIGS. 1 and 2, each of the plurality of air layers 10 is interposed between the transparent layers 9 that are next to each other of the plurality of transparent layers 9. Thus, the plurality of air layers 10 are, as shown in FIGS. 7 and 8, disposed at spaced intervals to each other (with the transparent layers 9 therebetween) in the up-down direction and each of the transparent layers 9 is sandwiched between the air layers 10 that are next to each other of the plurality of air layers 10.

Thus, when the daylighting film 1 is placed, for example, at the window 51 of the house 50, sunlight from outdoors (sunlight LL or sunlight LH) enters the transparent layer 9 and then, is reflected at the air layer 10 that is disposed below the transparent layer 9 upwardly to be introduced into indoors from the transparent layer 9. Thereafter, the introduced sunlight is reflected at the ceiling 53 or the like and illuminates the entire inside of the house 50. In this manner, improvement of brightness of the entire inside of the house 50 can be achieved.

The plurality of transparent layers 9 include the first transparent layer 20 having a relatively large index of refraction and the second transparent layer 21 having a relatively small index of refraction. Thus, the sunlight is refracted relatively largely on entering the first transparent layer 20 and it is refracted relatively small on entering the second transparent layer 21.

In this manner, the incident angle of the light (first incident light L1 or first incident light L4) entering the first transparent layer 20 with respect to the border 15 (first air layer 23) can be different from that of the light (second incident light L2 or second incident light L3) entering the second transparent layer 21 with respect to the border 17 (second air layer 24).

As a result, a range of the incident angle of the incident light (first incident light L1, first incident light L4, second incident light L2, and second incident light L3) with respect to the border (air layer 10), corresponding to the altitude of the sun, can be expanded. In this manner, even when the altitude of the sun changes, the daylighting film 1 enables the incident light (first incident light L1, first incident light L4, second incident light L2, and second incident light L3) to travel upwardly from the daylighting film 1 toward the ceiling 53 of the house 50.

In this manner, even when the altitude of the sun changes, efficient and stable daylighting can be achieved and brightness of the entire inside of the house 50 can be improved.

A difference of index of refraction between the first transparent layer 20 and the second transparent layer 21 is 0.05 or more, so that the incident angle (incident angle $\theta 1$, incident angle $\theta 4$) of the first incident light (first incident light L1, first incident light L4) with respect to the border 15 (first air layer 23) can be surely different from the incident angle (incident angle $\theta 2$, incident angle $\theta 3$) of the second incident light (second incident light L2, second incident light L3) with respect to the border 17 (second air layer 24).

As a result, the range of the incident angle of the incident light (first incident light L1, first incident light L4, second incident light L2, and second incident light L3) with respect to the border (air layer 10), corresponding to the altitude of the sun, can be surely expanded. As a result, brightness of the entire inside of the house 50 can be stably improved.

Also, a difference of index of refraction between the first transparent layer 20 and the second transparent layer 21 is 0.3 or less. Thus, material design of each of the first transparent layer 20 and the second transparent layer 21 can be easily achieved.

As shown in FIG. 2, the first transparent layers 20 and the second transparent layers 21 are alternately disposed in the up-down direction. Thus, as shown in FIGS. 7 and 8, light can be uniformly reflected in the entire up-down direction of the daylighting film 1. As a result, brightness of the entire inside of the house 50 can be further more stably improved.

4. Second Embodiment

Next, a second embodiment of the daylighting film 1 of the present invention is described with reference to FIG. 9. In the second embodiment, those members that are the same as in the above-described first embodiment are designated with the same reference numerals, and their descriptions are omitted.

In the first embodiment, as shown in FIGS. 1 and 2, the first transparent layers 20 and the second transparent layers 21 are alternately and continuously disposed at minute spaced intervals to each other (with the air layers 10 therebetween) in the up-down direction.

However, the arrangement of the first transparent layer 20 and the second transparent layer 21 is not particularly limited, as long as in the plurality of transparent layers 9, at least one first transparent layer 20 and one second transparent layer 21 are next to each other at spaced intervals (with the air layer 10 therebetween) in the up-down direction.

Figure 9:
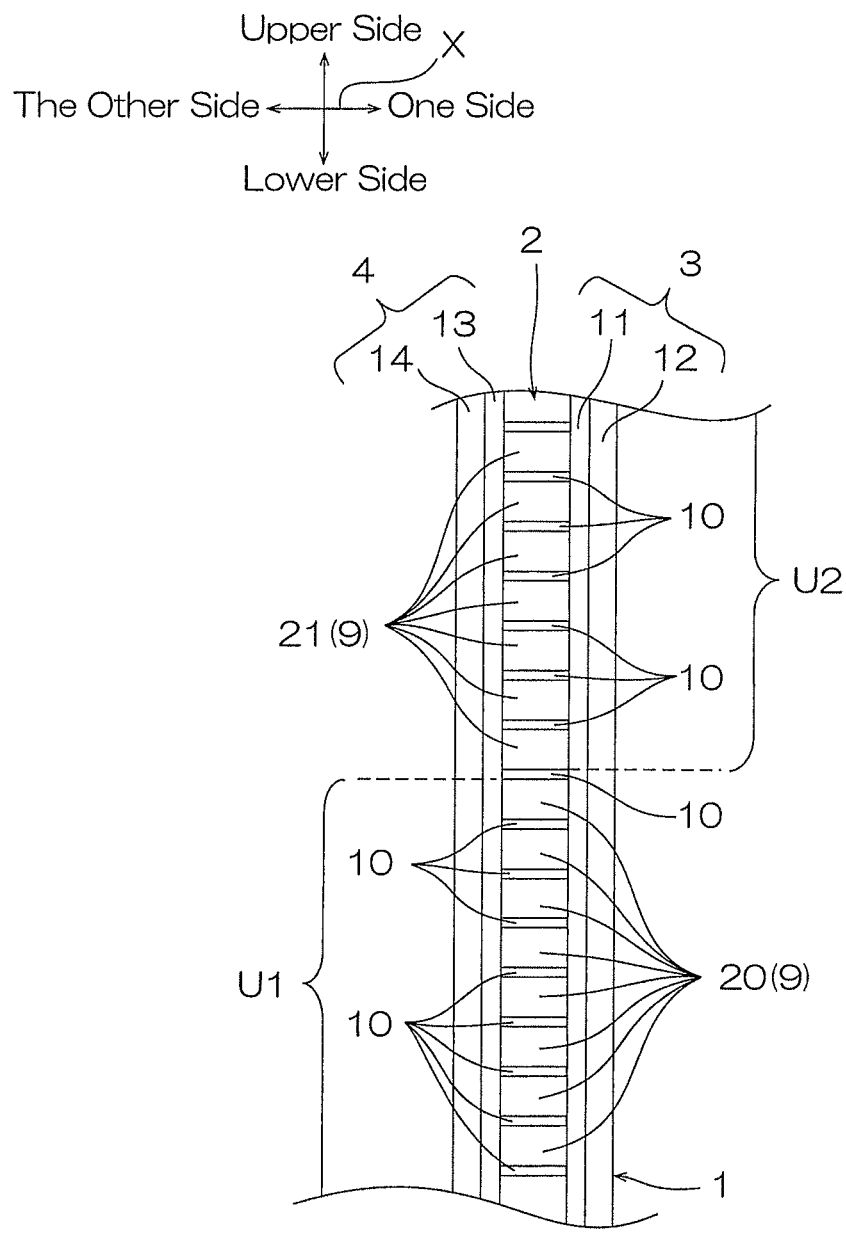
FIG. 9 shows a side view of a daylighting film as a second embodiment of the present invention.

In the second embodiment, for example, as shown in FIG. 9, the daylighting layer 2 includes a unit U1 composed of the plurality of first transparent layers 20 that are disposed in parallel with the air layers 10 therebetween in the up-down direction and a unit U2 composed of the plurality of second transparent layers 21 that are disposed in parallel with the air layers 10 therebetween in the up-down direction. The unit U1 is disposed below the unit U2 so as to be disposed in line in the up-down direction. That is, the uppermost first transparent layer 20 of the unit U1 is next to the lowermost second transparent layer 21 of the unit U2 with the air layer 10 therebetween in the up-down direction.

To prepare the daylighting film 1 including the unit U1 and the unit U2, as shown in FIG. 3, the plurality of first unit films 29 are laminated in the thickness direction without sandwiching a pressure-sensitive adhesive layer therebetween to prepare a first laminate (not shown) and the plurality of second unit films 30 are laminated in the thickness direction without sandwiching a pressure-sensitive adhesive layer therebetween to prepare a second laminate (not shown).

The first laminate (not shown) and the second laminate (not shown) are laminated in the lamination direction thereof, thereby configuring the laminate 31.

Next, as shown in FIGS. 4 and 5, for example, the daylighting layer 2 having one side surface to which the support 3 is bonded is cut out from the laminate 31 in an elongated flat belt shape and the peeling body 4 is bonded to the other side surface of the daylighting layer 2 in the same manner as that in the first embodiment. In this manner, as shown in FIG. 9, the daylighting film 1 including the unit U1 and the unit U2 is prepared.

With the second embodiment as well, the same operations and effects with the above-described first embodiment can be achieved.

5. Third Embodiment

Next, a third embodiment of the daylighting film 1 of the present invention is described with reference to FIGS. 10A and 10B. In the third embodiment, those members that are the same as in the above-described first embodiment are designated with the same reference numerals, and their descriptions are omitted.

In the first embodiment, as shown in FIGS. 1 and 2, the daylighting film 1 includes the plurality of air layers 10. Alternatively, in the third embodiment, as shown in FIG. 10A, the daylighting film 1 includes a plurality of metal layers 61, as one example of a reflection layer, instead of the plurality of air layers 10. In the third embodiment, the daylighting layer 2 of the daylighting film 1 is composed of the transparent layer 9 and the metal layer 61 only, and the transparent layers 9 and the metal layers 61 are disposed one by one continuously and repeatedly in the up-down direction.

The plurality of metal layers 61 are disposed in parallel at spaced intervals to each other (with the transparent layers 9 therebetween) in the up-down direction. Each of the plurality of metal layers 61 is interposed between the transparent layers 9 that are next to each other in the plurality of transparent layers 9 and is formed into a thin film extending in the entire right-left direction of the daylighting layer 2. Both upper and lower surfaces of the metal layer 61 are along the thickness direction X.

The metal layer 61 is configured to reflect light and is formed from a metal material into a thin film. Examples of metal materials that form the metal layer 61 include metal elements (e.g., gold, silver, copper, iron, aluminum, chromium, nickel, etc.) and alloys composed of a plurality of metal elements, and preferably, silver, aluminum, and an alloy containing those elements are used, or even more preferably, aluminum is used. Such a metal material can be used as a single thin film or two types or more of the thin film can be laminated.

The size in the up-down direction of the metal layer 61 is not particularly limited, as long as it can sufficiently reflect light, and, for example, 20 nm or more, or preferably 30 nm or more, and, for example, 10 μm ($10^4$ nm) or less, preferably 1 μm ($10^3$ nm) or less, or even more preferably 300 nm or less.

The reflectance of the metal layer 61 for light (incident angle of 5°) is, for light having a wavelength of 440 to 600 nm, for example, 70% or more, or preferably 80% or more, and, for example, 98% or less, or preferably 95% or less.

To produce such a daylighting film 1, as shown in FIG. 10B, each of the first unit film 29 including the first transparent layer 20 and the metal layer 61 and the second unit film 30 including the second transparent layer 21 and the metal layer 61 is prepared in a plural number.

To prepare such a first unit film 29, for example, a processing sheet is prepared by disposing the metal layer 61 on the surface (one side surface in the thickness direction) of the first transparent layer 20 and then, the first unit films 29 having a predetermined shape are cut out from the processing sheet or the metal layer 61 is disposed on the surface of the first transparent layer 20 having a predetermined shape to prepare the first unit films 29. The second unit film 30 is prepared in the same manner as that of the first unit film 29, except that the first transparent layer 20 is changed to the second transparent layer 21.

To dispose the metal layer 61 on the surface of the first transparent layer 20 (or second transparent layer 21), for example, the first transparent layer 20 (or second transparent layer 21) and the metal layer 61 are separately prepared to be laminated or the metal layer 61 is formed on the surface of the first transparent layer 20 (or second transparent layer 21). Preferably, the metal layer 61 is formed on the surface of the transparent layer 9.

To form the metal layer 61 on the surface of the first transparent layer 20 (or second transparent layer 21), for example, the metal layer 61 is formed on the surface of the first transparent layer 20 (or second transparent layer 21) by a known film-forming method. Examples of the known film-forming method include dry processing and wet processing. Preferably, dry processing is used.

Next, the plurality of first unit films 29 and the plurality of second unit films 30 are laminated in the thickness direction thereof so that the first unit films 29 and the second unit films 30 are alternately overlapped with each other, thereby preparing the laminate 31.

In such a laminate 31, an adhesive layer can be provided between the first unit film 29 and the second unit film 30 that are next to each other in the lamination direction, or the adhesive layer may not be provided. When an adhesive layer is not provided between the first unit film 29 and the second unit film 30 that are next to each other in the lamination direction, the laminate 31 is thermocompression bonded (heat pressed).

In the above manner, the columnar (block) laminate 31 extending in the lamination direction is formed.

Next, as shown in FIGS. 4 and 5, after the support 3 is bonded to the lateral face 32 of the laminate 31 (surface extending along the lamination direction) along the lamination direction in the same manner as that in the first embodiment, the lateral face layer 33 of the laminate 31 to which the support 3 is bonded is cut so that the first unit film 29 and the second unit film 30 are disposed in parallel to the lamination direction of the laminate 31.

In this manner, the daylighting layer 2 having one side surface to which the support 3 is bonded is cut out from the laminate 31 in an elongated flat belt shape. Subsequently, the peeling body 4 is bonded to the other side surface of the daylighting layer 2.

In the above manner, as shown in FIG. 10A, the daylighting film 1 is prepared.

With the third embodiment as well, the same operations and effects with the above-described first embodiment can be achieved.

6. Modification

In the above-described first to third embodiments, the plurality of transparent layers 9 include the first transparent layer 20 and the second transparent layer 21 only. Alternatively, in addition to the first transparent layer 20 and the second transparent layer 21, the plurality of transparent layers 9 can include a third transparent layer that has a different index of refraction from that of the first transparent layer 20 and the second transparent layer 21. Examples a third resin material that forms the third transparent layer include the same resin materials as those of the first resin material and the second resin material.

With such a modification, even when the altitude of the sun changes, efficient and further more stable daylighting can be achieved.

Each of the first to third embodiments and the modification can be suitably combined.

EXAMPLES

While in the following, the present invention is described in further detail with reference to Examples, the present invention is not limited to any of them by no means. The values such as the size in Examples can be replaced with the upper limit value or the lower limit value of corresponding parts described in the above-described embodiment.

Example 1

Each of a polycarbonate (PC) film (index of refraction of 1.60, first processing sheet) having a thickness of 100 μm and a tetrafluoroethylene•hexafluoride propylene copolymer (FEP) film (index of refraction of 1.34, second processing sheet) having a thickness of 100 μm was punched into a circular shape having a diameter of 18 cm, thereby producing 1000 first transparent layers (first unit films) having a thickness of 100 μm and 1000 second transparent layers (second unit films) having a thickness of 100 μm. The material and the index of refraction of the first transparent layer, those of the second transparent layer, and a difference of index of refraction between the first transparent layer and the second transparent layer are shown in Table 1.

Next, the first transparent layers and the second transparent layers were alternately laminated without using an adhesive therebetween and then, a pressure (5 MPa) was applied from both sides in the lamination direction to keep the cylindrical shape, thereby preparing a laminate. The laminate had a diameter of 18 cm and a height of (size in the lamination direction) 20 cm (100 μm×1000+100 μm×1000).

Then, the laminate and the support were set to the cutting device 40 shown in FIG. 5.

To be specific, the laminate was held by the pair of holding members 42 so as to sandwich the laminate from both sides in the lamination direction and the support was wound around the rotational shaft 41, thereby configuring a support roll.

At this time, the pair of holding members 42 sandwiched the laminate from both sides in the lamination direction with the above-described pressure (5 MPa). The support had a polypropylene film (carrier) having a thickness of 40 μm and an acrylic pressure-sensitive adhesive layer (pressure-sensitive adhesive layer) having a thickness of 30 μm. The acrylic pressure-sensitive adhesive layer was formed on one side surface of the polypropylene film and on the other side surface of the polypropylene film, a release-treatment layer was provided by a release-treatment agent.

When the laminate was held by the pair of holding members 42, the distal end of the cutting blade 35 was in contact with the lateral face of the laminate. The cutting blade 35 was disposed along the lamination direction of the laminate.

Then, the support drawn out from the support roll was pulled around toward the tangential line direction of the laminate so that the pressure-sensitive adhesive layer adhered to the lateral face of the laminate and was bonded to the lateral face of the laminate within the range of the central angle of 240° in the laminate.

Then, the pair of holding members 42 was driven and rotated counterclockwise when viewed from one side in the axial direction of the holding members 42 (frontward relative to the paper plane in FIG. 5) by the motor (not shown) of the cutting device 40.

Then, the laminate held by the pair of holding members 42 rotated with its axis as the center and the support roll was driven with the axis of the rotational shaft 41 as the center.

In this manner, the lateral face layer of the laminate to which the support was bonded was continuously cut out as in the Katsura-muki technique.

In the above manner, the daylighting layer (lateral face layer of the laminate) having one side surface to which the support was bonded was cut out in an elongated flat belt shape. The daylighting layer had a thickness of 150 μm.

In the daylighting layer, the first transparent layers composed of polycarbonate and the second transparent layers composed of tetrafluoroethylene•hexafluoride propylene copolymer were alternately and continuously disposed with the air layers 10 therebetween in the lamination direction (surface direction orthogonal to the thickness direction in the daylighting layer). That is, the lamination direction corresponds as one example of the first direction and corresponds to the up-down direction in the above-described first to third embodiments.

The first transparent layer had a size in the up-down direction of 100 μm; the second transparent layer had a size in the up-down direction of 100 μm; and the air layer had a size in the up-down direction of 1 μm.

Then, a double-side tape having a separator (peeling body) was separately prepared and a pressure-sensitive adhesive layer of the double-sided tape adhered to the other side surface (cut surface) of the daylighting layer. The double-sided tape had a PET film (peeling member, separator) having a thickness of 50 μm and an acrylic pressure-sensitive adhesive layer (pressure-sensitive adhesive layer) having a thickness of 50 μm. The acrylic pressure-sensitive adhesive layer was formed on one side surface of the PET film and on the other side surface of the PET film, a release-treatment layer was provided by a release-treatment agent.

In this manner, the support and the double-sided tape were bonded to the daylighting layer so as to sandwich the daylighting layer therebetween, thereby preparing the daylighting film. The daylighting film had a size in the thickness direction of 320 μm.

Then, the daylighting film was suitably cut in accordance with the size of a glass window to which the film was to be bonded. In this manner, a daylighting film of a rectangular shape when viewed from the top having a long side of 85 cm and a short side of 20 cm was produced.

Example 2

A daylighting film was obtained in the same manner as that in Example 1, except that the first processing sheet was changed to a polyvinyl chloride (PVC) film (index of refraction of 1.54) having a thickness of 100 μm and the second processing sheet was changed to an acrylic resin film (index of refraction of 1.49) having a thickness of 100 μm.

In the daylighting layer of the daylighting film, the first transparent layers composed of polyvinyl chloride and the second transparent layers composed of acrylic resin were alternately and continuously disposed with the air layers 10 therebetween in the lamination direction (surface direction orthogonal to the thickness direction in the daylighting layer). The material and the index of refraction of the first transparent layer, those of the second transparent layer, and a difference of index of refraction between the first transparent layer and the second transparent layer are shown in Table 1.

Comparative Example 1

A daylighting film was obtained in the same manner as that in Example 1, except that 2000 first transparent layers in a circular shape having a diameter of 18 cm were produced from a polycarbonate film (index of refraction of 1.60) having a thickness of 100 μm and the 2000 first transparent layers only were laminated without using an adhesive therebetween to prepare a cylindrical laminate.

In the daylighting layer according to Comparative Example 1, the first transparent layers composed of the polycarbonate films only were continuously disposed with the air layers 10 therebetween in the lamination direction (surface direction orthogonal to the thickness direction in the daylighting layer). The material and the index of refraction of the first transparent layer are shown in Table 1.

Comparative Example 2

A daylighting film was obtained in the same manner as that in Example 1, except that 2000 second transparent layers in a circular shape having a diameter of 18 cm were produced from a tetrafluoroethylene•hexafluoride propylene copolymer film (index of refraction of 1.34) having a thickness of 100 μm and the 2000 second transparent layers only were laminated without using an adhesive therebetween to prepare a cylindrical laminate.

In the daylighting layer according to Comparative Example 2, the second transparent layers composed of the tetrafluoroethylene•hexafluoride propylene copolymer films only were continuously disposed with the air layers 10 therebetween in the lamination direction (surface direction orthogonal to the thickness direction in the daylighting layer). The material and the index of refraction of the second transparent layer are shown in Table 1.

Comparative Example 3

A daylighting film was obtained in the same manner as that in Example 1, except that 2000 first transparent layers in a circular shape having a diameter of 18 cm were produced from a polyvinyl chloride film (index of refraction of 1.54) having a thickness of 100 μm and the 2000 first transparent layers only were laminated without using an adhesive therebetween to prepare a cylindrical laminate.

In the daylighting layer according to Comparative Example 3, the first transparent layers composed of the polyvinyl chloride films only were continuously disposed with the air layers 10 therebetween in the lamination direction (surface direction orthogonal to the thickness direction in the daylighting layer). The material and the index of refraction of the first transparent layer are shown in Table 1.

Comparative Example 4

A daylighting film was obtained in the same manner as that in Example 1, except that 2000 second transparent layers in a circular shape having a diameter of 18 cm were produced from an acrylic resin film (index of refraction of 1.49) having a thickness of 100 μm and the 2000 second transparent layers only were laminated without using an adhesive therebetween to prepare a cylindrical laminate.

In the daylighting layer according to Comparative Example 4, the second transparent layers composed of the acrylic resin films only were continuously disposed with the air layers 10 therebetween in the lamination direction (surface direction orthogonal to the thickness direction in the daylighting layer). The material and the index of refraction of the second transparent layer are shown in Table 1.

TABLE 1

| No. | | Ex. 1 | Ex. 2 | Comp. Ex. 1 |
|---|---|---|---|---|
| First Transparent Layer | Material | PC | PVC | PC |
|  | Index of Refraction | 1.60 | 1.54 | 1.60 |
| Second Transparent Layer | Material | FEP | Acrylic Resin | — |
|  | Index of Refraction | 1.34 | 1.49 | — |
| Difference of Index of Refraction | | 0.260 | 0.050 | — |

| No. | | Comp. Ex. 2 | Comp. Ex. 3 | Comp. Ex. 4 |
|---|---|---|---|---|
| First Transparent Layer | Material | — | PVC | — |
|  | Index of Refraction | — | 1.54 | — |
| Second Transparent Layer | Material | FEP | — | Acrylic Resin |
|  | Index of Refraction | 1.34 | — | 1.49 |
| Difference of Index of Refraction | | — | — | — |

(Evaluation)

The direction conversion efficiency of light with respect to the incident angle of light in each of the daylighting films in the obtained Examples and Comparative Examples was measured as follows.

Figure 11:
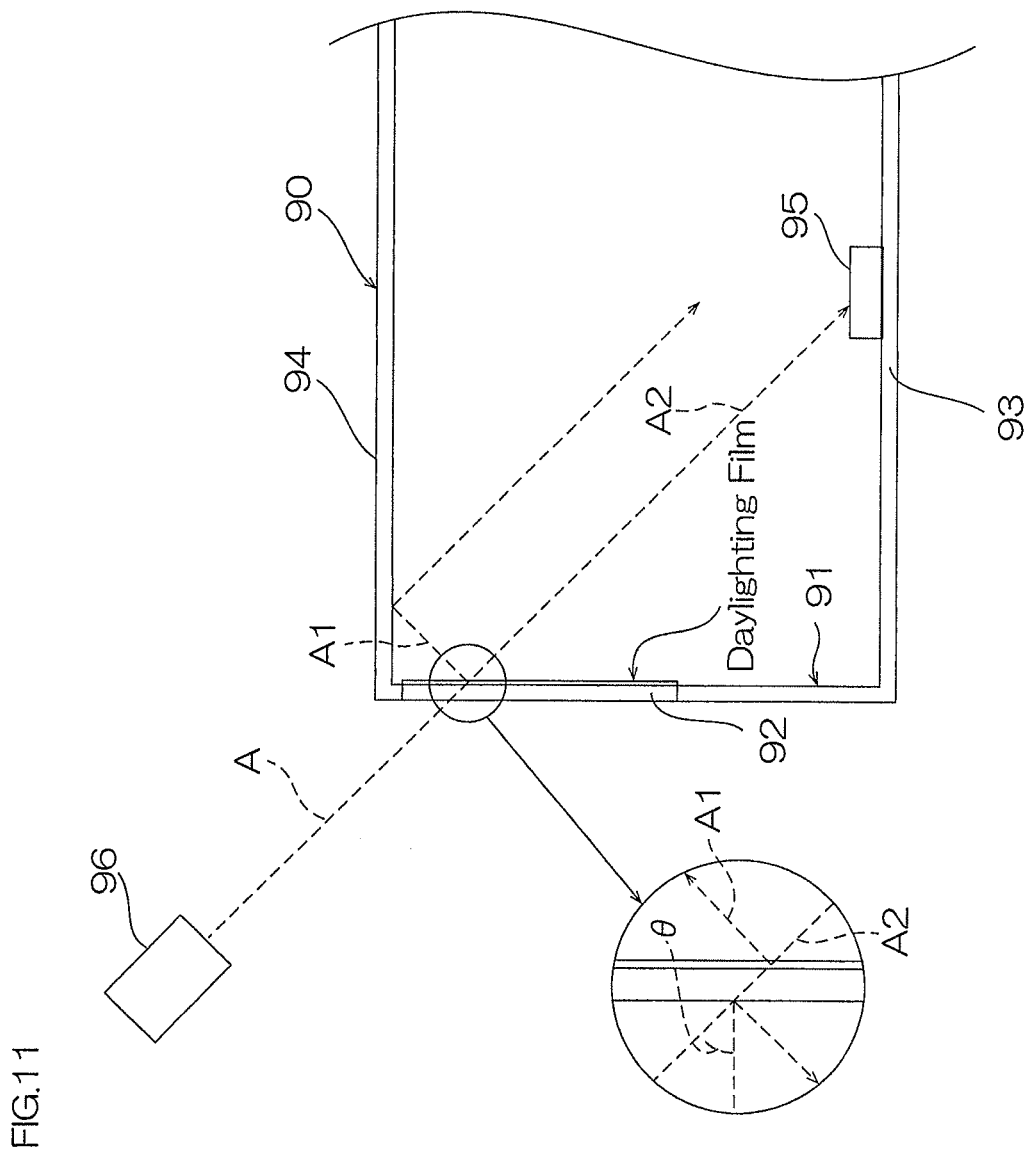
FIG. 11 shows an explanatory view for illustrating a measurement method of reference illuminance and measurement illuminance in Examples and Comparative Examples.

As shown in FIG. 11, a room 90 including a wall 91 at which a transparent glass window 92 is placed, a floor 93, and a ceiling 94 was prepared. The glass window 92 was a rectangular shape having a long side of 85 cm and a short side of 20 cm. The glass window 92 had a thickness of 3 mm.

Also, an illuminometer 95 (manufactured by T&D Corporation, illuminance UV recorder, trade name: TR-74Ui) and a light 96 (manufactured by Pi Photonics, Inc., trade name: HL01W) were prepared.

Next, white light was applied with the light 96 from the outside of the room 90 so that the incident angle θ of light with respect to the glass window 92 was 45°. A part of light applied from the light 96, as transmitted light A, transmitted through the glass window 92 and linearly traveled inside the room 90 to illuminate the floor 93. Meanwhile, the light other than the transmitted light A of the light applied from the light 96 was reflected at the outside of the room 90 by the glass window 92.

Then, the illuminometer 95 was disposed in the brightest place on the floor 93. To be specific, the illuminometer 95 was disposed on the floor 93 at a position 42.5 cm away from the wall 91. The illuminance on the floor 93 was measured with the illuminometer 95 and the obtained value was defined as the reference illuminance.

Next, the light 96 was moved so that the incident angle θ of light with respect to the glass window 92 was changed by 5° from 45° to 65°, while the illuminometer 95 was sequentially moved in the brightest place on the floor 93 in each of the incident angles θ. To be specific, the illuminometer 95 was disposed at a position 35.7 cm away from the wall 91 at the incident angle θ of 50°; at a position 29.8 cm away from the wall 91 at the incident angle θ of 55°; at a position 24.5 cm away from the wall 91 at the incident angle θ of 60°; and at a position 19.8 cm away from the wall 91 at the incident angle θ of 65°.

The reference illuminance on the floor 93 in each of the incident angles θ was measured with the illuminometer 95. The results are shown in Table 2.

Next, the peeling member of the peeling body in the daylighting film was peeled and then, the pressure-sensitive adhesive layer in the peeling body was bonded to the inner side surface of the glass window 92.

Next, light was applied with the light 96 from the outside of the room 90 so that the incident angle θ of light with respect to the glass window 92 was 45°. That is, the incident angle of the transmitted light A with respect to the daylighting film was 45°. The illuminometer 95 was disposed on the floor 93 at a position 42.5 cm away from the wall 91. The illuminance on the floor 93 was measured with the illuminometer 95 and the obtained value was defined as the measurement illuminance.

A part of the transmitted light A transmitted through the glass window 92; then, was reflected on the plurality of air layers of the daylighting film; and, as direction conversion light θ, traveled upwardly toward the ceiling 94. Another light A2 of the transmitted light A traveled downwardly toward the floor 93 after passing through the daylighting film.

Next, the light 96 was moved so that the incident angle θ of light with respect to the glass window 92 was changed by 5° from 45° to 65°, while the illuminometer 95 was sequentially moved on the floor 93 at a position 35.7 cm, 29.8 cm, 24.5 cm, and 19.8 cm away from the wall 91. Then, the measurement illuminance on the floor 93 in each of the incident angles θ was measured.

The direction conversion efficiency of light in each of the incident angles θ was calculated by the following formula (1). The results are shown in Table 2.

$$\text{Direction conversion efficiency of light [\%]} = ((\text{reference illuminance [lx]} - \text{measurement illuminance [lx]})/\text{reference illuminance [lx]}) \times 100 \quad \text{Formula (1)}$$

TABLE 2

| | | | Ex. 1 | | Ex. 2 | | Comp. Ex. 1 | |
|---|---|---|---|---|---|---|---|---|
| No. | | Reference Illuminance [lx] | Measurement Illuminance [lx] | Direction Conversion Efficiency [%] | Measurement Illuminance [lx] | Direction Conversion Efficiency [%] | Measurement Illuminance [lx] | Direction Conversion Efficiency [%] |
| Incident Angle θ [°] | 45 | 13.580 | 2.173 | 84 | 2.173 | 84 | 3.395 | 75 |
| | 50 | 13.380 | 1.606 | 88 | 1.472 | 89 | 2.408 | 82 |
| | 55 | 13.080 | 1.831 | 86 | 0.654 | 95 | 1.308 | 90 |
| | 60 | 12.570 | 1.760 | 86 | 0.629 | 95 | 0.377 | 97 |
| | 65 | 11.800 | 3.658 | 69 | 1.180 | 90 | 0.590 | 95 |

| | | | Comp. Ex. 2 | | Comp. Ex. 3 | | Comp. Ex. 4 | |
|---|---|---|---|---|---|---|---|---|
| No. | | Reference Illuminance [lx] | Measurement Illuminance [lx] | Direction Conversion Efficiency [%] | Measurement Illuminance [lx] | Direction Conversion Efficiency [%] | Measurement Illuminance [lx] | Direction Conversion Efficiency [%] |
| Incident Angle θ [°] | 45 | 13.580 | 1.088 | 92 | 2.852 | 79 | 1.765 | 87 |
| | 50 | 13.380 | 0.669 | 95 | 1.873 | 86 | 0.937 | 93 |
| | 55 | 13.080 | 2.093 | 84 | 1.043 | 92 | 0.131 | 99 |
| | 60 | 12.570 | 3.394 | 73 | 0.126 | 99 | 1.006 | 92 |
| | 65 | 11.800 | 5.546 | 53 | 0.826 | 93 | 1.770 | 85 |

Figure 12:
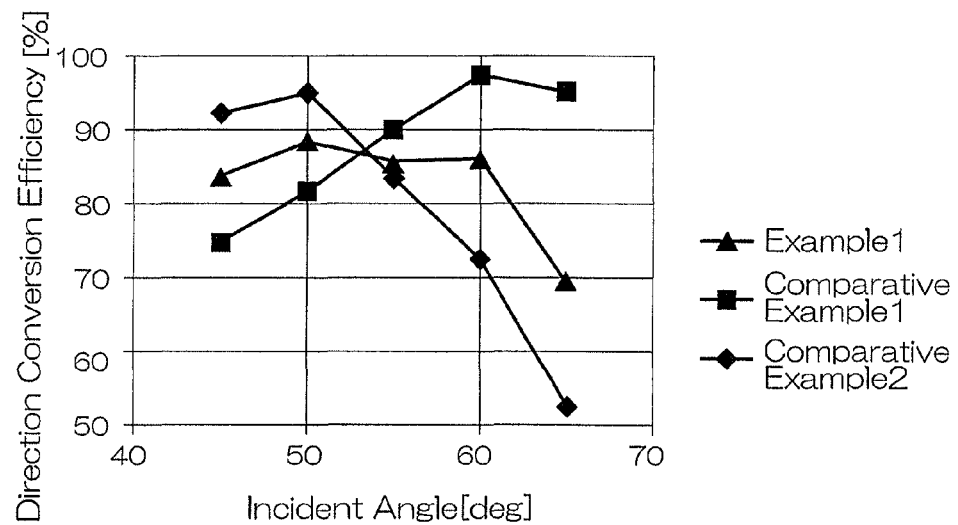
FIG. 12 is a view showing a change of direction conversion efficiency of light with respect to incident angle in daylighting films in Example 1 and Comparative Examples 1 and 2.
Figure 13:
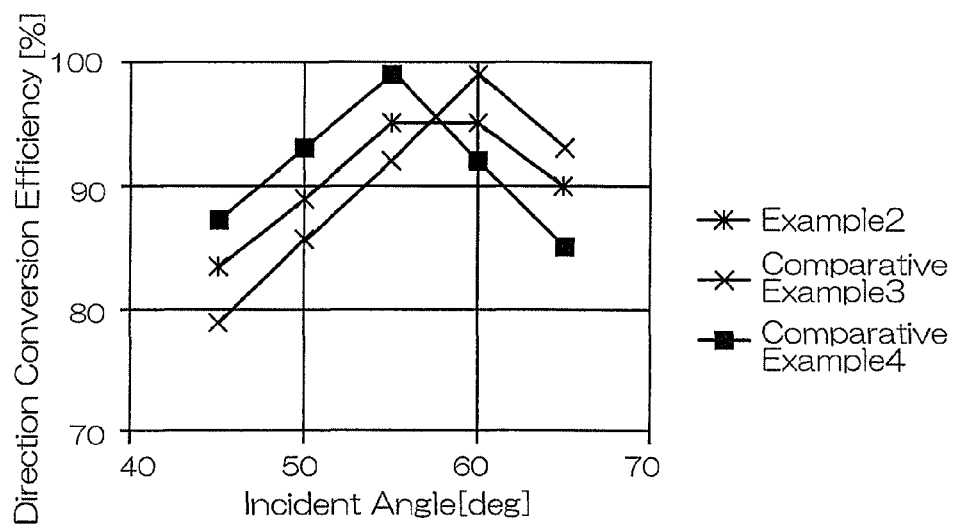
FIG. 13 is a view showing a change of direction conversion efficiency of light with respect to incident angle in daylighting films in Example 2 and Comparative Examples 3 and 4.

A change of the direction conversion efficiency of light with respect to the incident angle θ is shown in FIGS. 12 and 13.

As shown in FIG. 12, in Comparative Example 1, when the incident angle θ is large (e.g., when the incident angle θ is 60°), the direction conversion efficiency of light is high and as the incident angle θ becomes smaller, the direction conversion efficiency of light is reduced. In Comparative Example 2, when the incident angle θ is small (e.g., when the incident angle θ is) 50°, the direction conversion efficiency of light is high and as the incident angle θ becomes larger, the direction conversion efficiency of light is reduced.

On the other hand, in Example 1, stable direction conversion efficiency of light is ensured, without depending on the change of the incident angle θ. To be specific, in Example 1, the difference between the highest value of the direction conversion efficiency of light (when the incident angle θ is 50°) and the lowest value of the direction conversion efficiency of light (when the incident angle θ is 65°) is smaller than the difference between the highest value and the lowest value of the direction conversion efficiency of light in each of Comparative Examples 1 and 2.

Thus, even when the altitude of the sun (incident angle) changes in accordance with the change of time or season, stable daylighting can be achieved.

As shown in FIG. 13, in Comparative Example 3, when the incident angle θ is 60°, the direction conversion efficiency of light is high and it is reduced with an increase or decrease from 60° of the incident angle θ. Also, in Comparative Example 4, when the incident angle θ is 55°, the direction conversion efficiency of light is high and it is reduced with an increase or decrease from 55° of the incident angle θ.

On the other hand, in Example 2, stable direction conversion efficiency of light is ensured, without depending on the change of the incident angle θ. To be specific, in Example 2, the difference between the highest value of the direction conversion efficiency of light (when the incident angle θ is 55° or 60°) and the lowest value of the direction conversion efficiency of light (when the incident angle θ is 45°) is smaller than the difference between the highest value and the lowest value of the direction conversion efficiency of light in each of Comparative Examples 3 and 4.

Thus, even when the altitude of the sun (incident angle) changes in accordance with the change of time or season, stable daylighting can be achieved.

Among all, in Examples 1 and 2, stable daylighting can be achieved in the range of 45° to 65° of the incident angle θ, so that stable daylighting can be achieved, for example, in a place where the culmination altitude is in the range of 45° to 65°. To be specific, with the daylighting films in Examples 1 and 2, stable daylighting can be achieved for most of the time in a year in Tokyo (Japan) or the like where the culmination altitude is 54° on the vernal equinox and autumnal equinox.

While the illustrative embodiments of the present invention are provided in the above description, such is for illustrative purpose only and it is not to be construed as limiting in any manner. Modifications and variations of the present invention that will be obvious to those skilled in the art are to be covered by the following claims.

What is claimed is:

1. An optical film comprising:
a daylighting layer;
a support next to one side in a thickness direction of the daylighting layer and extending in a first direction orthogonal to the thickness direction,
wherein the daylighting layer includes a plurality of transparent layers configured to transmit light and a plurality of reflection layers configured to reflect light,
the plurality of transparent layers and the plurality of reflection layers are alternately disposed in the first direction,
one end portions of the plurality of transparent layers and the plurality of reflection layers are in contact with the support,
the plurality of transparent layers include
a first transparent layer and a second transparent layer that has a smaller index of refraction than that of the first transparent layer,
the first transparent layer is formed from a transparent first resin material, and
the second transparent layer is formed from a transparent second resin material having a smaller index of refraction that that of the first resin material.

2. The optical film according to claim 1, wherein a difference of index of refraction between the first transparent layer and the second transparent layer is 0.05 to 0.3.

3. The optical film according to claim 1, wherein in the plurality of transparent layers, the first transparent layer and the second transparent layer are alternately disposed in the first direction.

4. The optical film according to claim 1, wherein the first resin material is a resin material having an index of refraction of 1.5 or more, and
the second resin material is a resin material having an index of refraction of below 1.5.

5. The optical film according to claim 1, wherein each of the plurality of reflection layers is an air layer formed as a gap between each of the transparent layers that are next to each other.

6. The optical film according to claim 1, wherein each of the plurality of reflection layers is a metal layer formed from a metal material.

* * * * *